(12) United States Patent
Narendranathan et al.

(10) Patent No.: US 12,248,938 B2
(45) Date of Patent: *Mar. 11, 2025

(54) SYSTEMS AND METHODS FOR BLOCKCHAIN BASED IDENTITY ASSURANCE AND RISK MANAGEMENT

(71) Applicant: NEUROSYMBOLIC AI-IP, LLC, Gilbert, AZ (US)

(72) Inventors: Agasthya P. Narendranathan, San Ramon, CA (US); James M. Dzierzanowski, Gilbert, AZ (US)

(73) Assignee: NEUROSYMBOLIC AI-IP, LLC, Gilbert, AZ (US)

(*) Notice: Subject to any disclaimer, the term of this patent is extended or adjusted under 35 U.S.C. 154(b) by 379 days.

This patent is subject to a terminal disclaimer.

(21) Appl. No.: 17/693,766

(22) Filed: Mar. 14, 2022

(65) Prior Publication Data
US 2022/0198458 A1  Jun. 23, 2022

Related U.S. Application Data

(63) Continuation of application No. 16/846,677, filed on Apr. 13, 2020, now Pat. No. 11,321,718, which is a
(Continued)

(51) Int. Cl.
*G06F 21/60* (2013.01)
*G06F 21/62* (2013.01)
(Continued)

(52) U.S. Cl.
CPC ....... *G06Q 20/4016* (2013.01); *G06F 21/602* (2013.01); *G06F 21/6245* (2013.01); *H04L 9/50* (2022.05)

(58) Field of Classification Search
CPC ............. G06Q 20/4016; G06F 21/602; G06F 21/6245; G06F 21/64; H04L 9/50; H04L 9/3239

See application file for complete search history.

(56) References Cited

U.S. PATENT DOCUMENTS 10,554,649 B1 * 2/2020 Fields ................... H04L 9/3263
2004/0199470 A1  10/2004 Ferry, Jr.
(Continued)

FOREIGN PATENT DOCUMENTS

| WO | 2015024129 | 2/2015 |
| WO | 2017090041 | 6/2017 |

OTHER PUBLICATIONS

USPTO; Non-Final Office Action dated Oct. 18, 2019 in U.S. Appl. No. 16/037,986.
(Continued)

*Primary Examiner* — Trong H Nguyen
(74) *Attorney, Agent, or Firm* — SNELL & WILMER L.L.P.

(57) ABSTRACT

The method includes receiving a first identity attribute; determining a corresponding first level of assurance (LOA) based on the first identity attribute and a first attribute history; receiving a second identity attribute; determining a corresponding second LOA based on the second identity attribute and a second attribute history; defining a Self-Sovereign Identity (SSI) based on the first identity attribute, the second identity attribute, the first LOA, and the second LOA; and determining an aggregate LOA based on the SSI.

20 Claims, 7 Drawing Sheets

Related U.S. Application Data continuation of application No. 16/037,986, filed on Jul. 17, 2018, now abandoned.

(60) Provisional application No. 62/533,241, filed on Jul. 17, 2017, provisional application No. 62/641,905, filed on Mar. 12, 2018.

(51) Int. Cl.
*G06Q 20/40* (2012.01)
*H04L 9/00* (2022.01)

(56) References Cited

U.S. PATENT DOCUMENTS

| | | | |
|---|---|---|---|
| 2006/0062157 A1* | 3/2006 | Yamamoto | G06T 11/206 370/254 |
| 2008/0210753 A1 | 9/2008 | Plozay | |
| 2016/0028552 A1 | 1/2016 | Spanos et al. | |
| 2016/0203491 A1* | 7/2016 | Ranganathan | G06F 21/33 705/44 |
| 2016/0342994 A1* | 11/2016 | Davis | G06Q 20/0655 |
| 2017/0140204 A1 | 5/2017 | Derakhshani | |
| 2018/0285879 A1* | 10/2018 | Gadnis | G06Q 20/425 |
| 2019/0089717 A1 | 3/2019 | Dolev | |
| 2019/0182257 A1 | 6/2019 | Lee | |
| 2019/0295162 A1* | 9/2019 | Wang | H04L 9/0866 |

OTHER PUBLICATIONS

USPTO; Non-Final Office Action dated Oct. 8, 2020 in U.S. Appl. No. 16/846,677.

USPTO; Notice of Allowance dated Mar. 10, 2022 in U.S. Appl. No. 16/846,677.

Elham Ramezani, "Mobile Payment", Jun. 2008, E- Business Technology, web, 1-18 (Year: 2008), pp. 1-19.

* cited by examiner

SYSTEMS AND METHODS FOR BLOCKCHAIN BASED IDENTITY ASSURANCE AND RISK MANAGEMENT

CROSS-REFERENCE TO RELATED APPLICATIONS

This application is a continuation of, claims priority to and the benefit of, U.S. Non-Provisional application Ser. No. 16/846,677 entitled "SYSTEMS AND METHODS FOR BLOCKCHAIN BASED IDENTITY ASSURANCE AND RISK MANAGEMENT," filed Apr. 13, 2020. The '677 application claims priority to, and the benefit of, U.S. Non-Provisional application Ser. No. 16/037,986 entitled "SYSTEMS AND METHODS FOR BLOCKCHAIN BASED IDENTITY ASSURANCE AND RISK MANAGEMENT," filed Jul. 17, 2018. The '986 application claims priority to, and the benefit of, U.S. Provisional Application Ser. No. 62/533,241 entitled "SYSTEMS AND METHODS FOR DYNAMIC RISK SCORING FOR DETECTION AND PREVENTION OF FRAUDULENT SESSION AND/OR DEVICE" filed Jul. 17, 2017, and U.S. Provisional Application Ser. No. 62/641,905 entitled "BLOCKCHAIN BASED IDENTITY ASSURANCE" filed Mar. 12, 2018, the entire contents of each are incorporated by reference herein for all purposes. This application also incorporates by reference for all purposes U.S. Provisional Application Ser. No. 62/261,571 entitled "IDENTITY AND ACCESS MANAGEMENT" filed Dec. 1, 2015.

FIELD

This disclosure relates to systems and methods for detecting various forms of attempted fraud and risk associated with a transaction. More particularly, the disclosure relates to systems and methodologies that score risk for online transactions and for trusted transfers of personally identifiable information.

BACKGROUND

A high degree of certainty as to the identity of the parties involved is needed to avoid fraud in an online transactions involving the transmission of sensitive or confidential information. It is well known that members of the public access the Internet for the purpose of conducting financial transactions, healthcare interactions, online banking and purchasing of merchandise. During transactions, these commercial systems suffer from a common disadvantage in that they rely on the transmission of sensitive information over unsecured network routes and lines using, very often, untrusted devices in suspicious locations during abnormal times. While these systems often rely on encryption, password protection and other security options that are considered relatively safe, there remains significant risk of fraud, identify theft and misappropriation of information.

Advanced risk-based authentication techniques can reduce an organization's exposure to potentially costly, reputation-damaging information security breaches. Unauthorized access to sensitive data presents a pervasive threat to an organization's brand equity, competitive posture, and reputation. Given today's evolving threat landscape, traditional identity and access management technologies may no longer suffice. Many corporate leaders are justifiably concerned about the impact of a security incident, and pressure is mounting to not only detect but, more importantly, prevent or minimize threats. A strong need exists for the next-generation identity and access management solutions employing advanced risk-based authentication techniques.

Moreover, many customers refrain from purchasing merchandise and conducting e-commerce over the Internet. There remains a persistent fear that credit card, account and other personal information will be intercepted online by a third party computer hacker and used illegally despite ongoing security efforts. This comes at great expense for users who become victims of identity theft and fraud. Consequently, a need exists for online solutions that detect session manipulation or tampering so that fraud and the misappropriation or misuse of confidential information can be avoided.

SUMMARY

Systems, methods and articles of manufacture (collectively, the "system") for blockchain based identity management are disclosed. The system may include an identity management blockchain node configured to communicate with an identity management blockchain. The system may write account creation information to the identity management blockchain, wherein the account creation information comprises a plurality of account creation identity attributes. The system may write to the identity management blockchain an association between a self-sovereign identity (SSI) and each of the account creation identity attributes. The system may receive trusted relationship data associated with a trust source. The system may write, to the identity management blockchain, the association between the trusted relationship data and the trust source as a plurality of trustlinks associated with the SSI.

The system may retrieve a trusted record from the identity management blockchain, wherein the trusted record is written to the identity management blockchain by at least one of a data provider blockchain node or a financial institution blockchain node. The trusted record may be retrieved based on the plurality of trustlinks. The system may write a plurality of Level of Assurance (LOA) scores to the identity management blockchain, wherein each of the plurality of LOA scores are associated on a one-to-one basis with each of the plurality of the trust links.

In various embodiments, the system may write an aggregate LOA score associated with the SSI to the identity management blockchain. In various embodiments, each of the plurality of trustlinks are associated on a many-to-one basis with the SSI, a many-to-one basis with a trust source, a one-to-one basis with a trusted record element, and on a one-to-one basis with the an identity attribute. In response to writing, by the IM blockchain node to the identity management blockchain, the plurality of trustlinks associated with the SSI, at least one of the data provider blockchain node or the financial institution blockchain node may be configured to transmit the trusted record. In various embodiments, the plurality of trustlinks define a branching structure or a portion of the branching structure of a graphical database comprising a plurality of identity attributes related to the SSI, a trust source, and a plurality of trusted record elements. In response to writing, by the IM blockchain node to the identity management blockchain, the plurality of LOA scores associated with plurality of trustlinks, the financial institution blockchain node may be configured to update a transaction rule.

BRIEF DESCRIPTION OF THE DRAWINGS

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
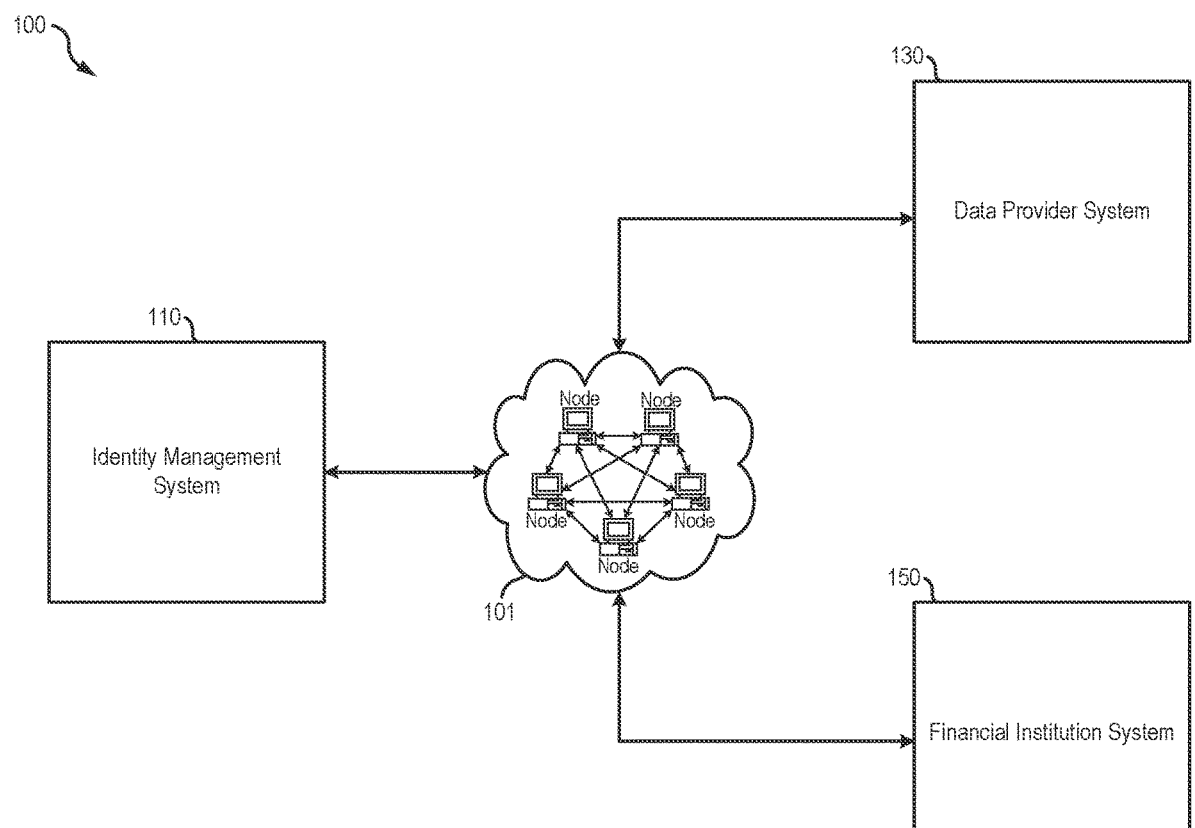
FIG. 1 is a block diagram illustrating a blockchain based identity management system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical, software and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, the disclosure provides methods and apparatus for detecting when an online session includes or may involve fraudulent activity or data. In various embodiments, a plurality of device fingerprints may be collected from a user computer or a device (Thing) that is associated with a uniquely designated User ID (e.g., hash). A server may include pages or data that are delivered to a user or device for viewing in a browser or an application (e.g., mobile or desktop/server computer) at which time device fingerprint data, User data, Session ID information and geographic location information are collected. By collecting device (Thing) fingerprints and session and user (People) information at several locations (Places) at local times (Time) using the clock of the server computer or clock of the computer used in conjunction with the transaction (Transaction) type (e.g., moving money between accounts vs password reset), among the pages or data delivered by the server throughout an online session (when a specific transaction is actioned, and not only one time or at log-in), a comparison between the device fingerprint in association with a User and Session ID, location, time, and transaction can identify the likelihood of a fraudulent session that is deemed risky based on a risk score returned using predictive modeling techniques such as, for example, Big Data Heuristics, Clustering and Dimensionality Reduction.

The systems, methods, and computer readable mediums (collectively, the "system") described herein, in accordance with various embodiments, may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers (e.g., updates to an identity management blockchain, etc.) performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of personal data such as personally identifiable information by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

With reference to FIG. 1, a blockchain based identity management system 100 is depicted according to various embodiments. System 100 may include various computing devices, software modules, networks, and data structures in communication with one another. System 100 may also contemplate uses in association with web services, utility computing, quantum computing, pervasive and individualized computing, security and identity solutions, autonomic computing, cloud computing, commodity computing, mobility and wireless solutions, open source, biometrics, grid computing and/or mesh computing. System 100 based on a blockchain, as described herein, may simplify and automate information transfers of identity associated information and related processes by using the blockchain as a distributed and tamper-proof data store of data-to-identity links. Transparency is very high for various embodiments using a federated or public blockchain since validation is performed, for example, using data stored by a decentralized autonomous organization (DAO) instead of a specific institution or data broker.

In various embodiments, system 100 may comprise an identity management system 110, one or more data provider systems such as a data provider system 130, one or more financial institution systems such as financial institution system 150, and/or a blockchain network 101. Blockchain network 101 may be in electronic communication with identity management system 110, institutional system 130, and/or data broker system 150, via one or more blockchain nodes, as discussed further herein. Blockchain network 101 may be a blockchain network or peer-to-peer network that is private, consortium and/or public in nature (e.g., ETHEREUM®, Bitcoin, HYPERLEDGER® Fabric, etc.). Consortium and private networks may offer improved control over the content of the blockchain and public networks may leverage the cumulative computing power of the network to improve security. The blockchain network 101 may comprise various transfer blockchain nodes in electronic communication with each other, as discussed further herein.

In various embodiments, identity management system 110 may enable a user to interact with system 100 to create an account, submit elements (e.g., a first element, a second element, a third element, etc.) of identity data such as, for example, Personally Identifiable Information (PII) and/or Personal Data (PD), establish data links, authorize transactions, visualize data structures, and/or the like. Identity management system 110 may comprise any suitable combination of hardware, software, and/or database components. For example, identity management system 110 may comprise at least one computing device in the form of a computer or processor, or a set of computers/processors, although other types of computing units or systems may be used (e.g., a server, web server, pooled servers, or the like). Identity management system 110 may also include one or more data centers, cloud storages, or the like, and may include software (e.g., APIs) configured to retrieve and write data to the blockchain. In various embodiments, identity management system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Although the present disclosure makes reference to identity management system 110, it should be understood that principles of the present disclosure may be applied to a blockchain based identity management system having any suitable number of identity management systems interconnected to blockchain network 101.

Figure 2A:
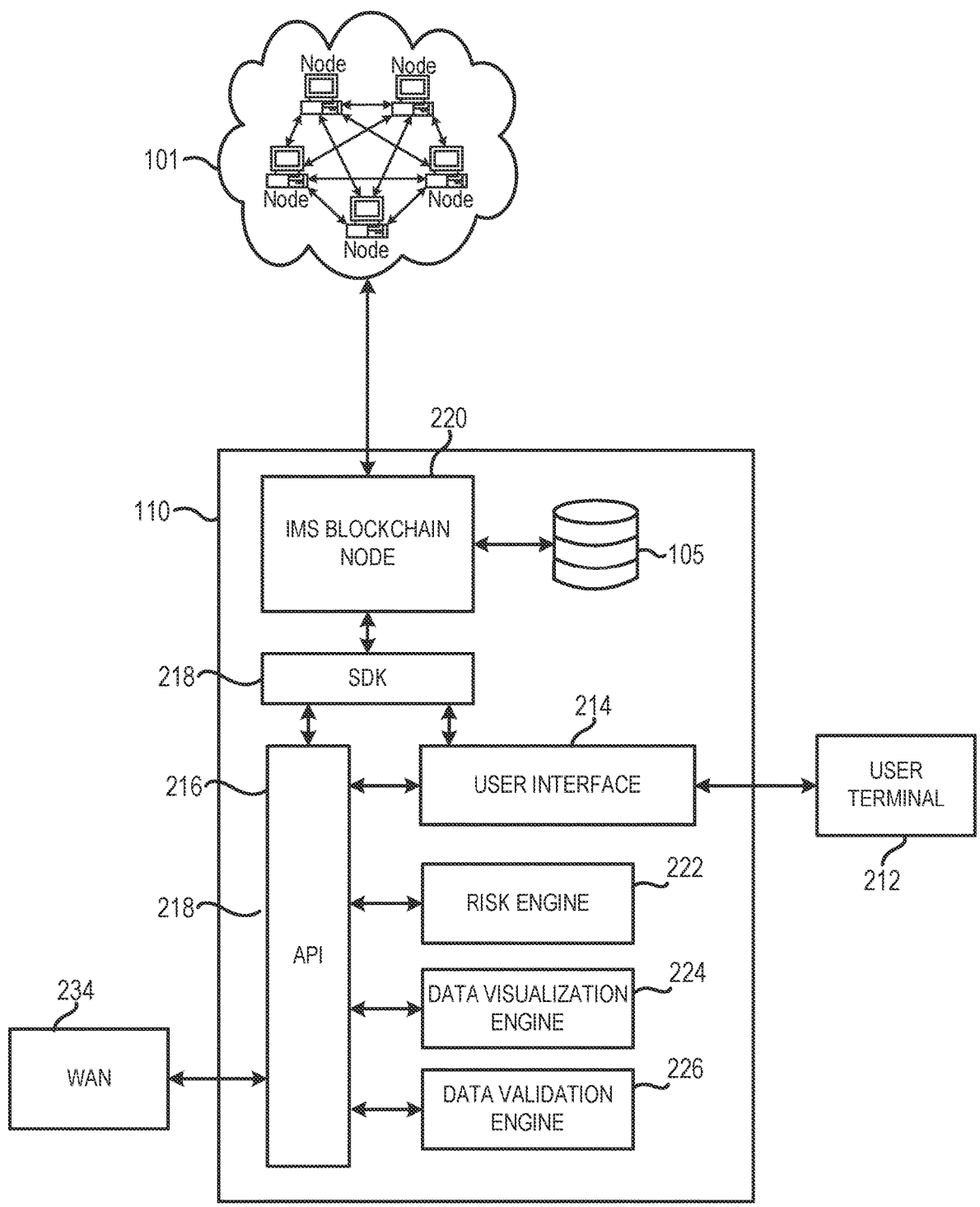
FIG. 2A illustrates an exemplary identity manager system in a blockchain based identity management system, in accordance with various embodiments.

In various embodiments, and with reference to FIG. 2A, an exemplary identity management system 110 is depicted. Identity management system 110 may comprise one or more of a user terminal 212, an identity management user interface (UI) 214, an application programming interface (API) 216, a software development kit (SDK) 218, a risk engine 222, a data visualization engine 224, a data validation engine 226, and/or an identity management system blockchain node 220 configured to maintain identity management blockchain 105. User terminal 212, identity management user interface 214, API 216, SDK 218, risk engine 222, data visualization engine 224, data validation engine 226, and/or Identity Manager (IM) blockchain node 220 may be in logical communication with each other via a bus, network, and/or through any other suitable means, or may be individually connected as described further herein.

In various embodiments, user terminal 212 may be configured to provide an identity manager, user, or the like access to identity management system 110. For example, the user may interact with identity management system 110, via user terminal 212, to input and submit PII and/or PD, initiate and/or establish links with institutional systems and/or data brokers, view PII and/or PD validations, construct belief operators, visualize data etc., as discussed further herein. User terminal 212 may be in electronic communication with identity management user interface 214, and may comprise any suitable hardware, software, and/or database components capable of sending, receiving, and storing data. For example, user terminal 212 may comprise a personal computer, personal digital assistant, cellular phone, smartphone (e.g., IPHONE®, BLACKBERRY®, and/or the like), Internet of things (IoT) device, kiosk, and/or the like. User terminal 212 may comprise an operating system, such as, for example, a WINDOWS® mobile operating system, an ANDROID® operating system, APPLE® IOS®, a BLACKBERRY® operating system, and the like. User terminal 212 may comprise software components installed on user terminal 212 and configured to allow a user, via user terminal 212, access to identity management user interface 214 in identity management system 110. For example, user terminal 212 may comprise a web browser (e.g., MICROSOFT INTERNET EXPLORER®, GOOGLE CHROME®, etc.), an application, a micro-app or mobile application (e.g., downloaded via APPLE® APP STORE®, GOOGLE PLAY®, etc.), or the like, configured to allow a user to access and interact with identity management user interface 214.

In various embodiments, identity management user interface 214 may be accessible via user terminal 212. Identity management user interface 214 may comprise software, a web page, or the like, and may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like on user terminal 212. In that regard, the user, via user terminal 212, may access identity management user interface 214 to register for the identity management blockchain, submit account creation information, submit trusted relationship data, visualize a graphical data structure of data links, and establish trusted links. In various embodiments, identity management user interface 214 may be in electronic communication with IM blockchain node 220 via API 216 and/or SDK 218

In various embodiments, API 216 and SDK 218 may be configured to provide software, services, and interfaces to enable communications between identity management user interface 214, risk engine 222, data visualization engine 224, data validation engine 226, and IM blockchain node 220. API 216 and SDK 218 may comprise programmatic libraries configured to translate and transmit queries and commands from identity management user interface 214, risk engine 222, data visualization engine 224, and data validation engine 226 to identity management system blockchain node 220. For example, and in accordance with various embodiments, API 216 and/or SDK 218 may be configured to translate requests received by identity management user interface 214 into a blockchain format using a blockchain SDK library, or the like, which may include digital signing using user-specific security certificates. In that respect, API 216 and/or SDK 218 may comprise one or more user-specific cryptographic keys used to perform cryptographic operations. As a further example, and in accordance with various embodiments, API 216 and/or SDK 218 may be configured to translate data retrieved from identity management blockchain 105 into a format readable by identity management user interface 214 and/or system engines (222, 224, 226), which may include digital signature verification and/or data transformation from a blockchain specific data layout to an application specific data layout. As an example, SDK 218 may include a blockchain oracle configured to generate one or more notifications in response to data being written to identity management blockchain 105. The blockchain oracle may be configured to query identity management blockchain node 220 at a defined interval to search for new writes to identity management blockchain 105. The blockchain oracle may be controlled by notification triggers containing filters indicating the types of data written to identity management blockchain 105 that will generate a notification. For example, in response to the blockchain oracle determining that data has been written to identity management blockchain 105 that includes the user ID, data provider ID, and trusted record from the data provider (e.g., validating information linked to a trust relationship data was written to identity management blockchain 105), the blockchain oracle may generate a data validation notification and transmit the data validation notification to data validation engine 226.

In various embodiments, IM blockchain node 220 may be in electronic communication with blockchain network 101, and may be configured to allow identity management system 110 access to identity management blockchain 105 and blockchain network 101. IM blockchain node 220 may be configured to maintain a copy of identity management blockchain 105, write and/or retrieve data and blocks from identity management blockchain 105, validate blocks of identity management blockchain 105, and/or propagate writes to identity management blockchain 105 to blockchain network 101. IM blockchain node 220 may communicate with one or more blockchain nodes to validate and write blocks to identity management blockchain 105, and to establish consensus between the blockchain nodes based on proof of work, proof of stake, practical byzantine fault tolerance, delegated proof of stake, or other suitable consensus algorithms.

IM blockchain node 220 may comprise one or more computing devices (e.g., computer or processor) or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. IM blockchain node 220 may run applications to interact with identity management blockchain 105, communicate with other devices, perform crypto operations, and otherwise operate within identity management system 110. For example, IM blockchain node 220 may run a client application that can be a thin client (web), a hybrid (i.e., web and native, such as iOS and Android), or a native application to make application programming interface (API) calls to interact with identity management blockchain 105, such as a web3 API compatible with blockchain databases maintained by ETHEREUIM®.

In various embodiments, identity management blockchain 105 may be a distributed ledger that maintains records in a readable manner and that is resistant to tampering. Identity management blockchain 105 may be based on blockchain technologies such as, for example, ETHEREUM®, Open Chain, Chain Open Standard, HYPERLEDGER® Fabric, CORDA CONNECT®, INTEL® Sawtooth, etc. Identity management blockchain 105 may comprise a ledger of interconnected blocks containing data. Each block may link to the previous block and may include a timestamp. Each block may hold one or more PII, PD, level of assurance (LOA) scores, transaction data, payments, or the like. When implemented in support of system 100, identity management blockchain 105 may serve as an immutable log of transaction in system 100. Identity management blockchain 105 may be maintained on various transfer blockchain nodes (e.g., data provider blockchain node 220 etc.) in the form of copies or partial copies of the identity management blockchain, as discussed further herein. Blocks (e.g., including PII, PD, LOA scores, transaction data, etc.) may be written to identity management blockchain 105 by establishing consensus between the blockchain nodes based on proof of work, proof of stake, practical byzantine fault tolerance, delegated proof of stake, or other suitable consensus algorithms.

Although the present disclosure makes reference to identity management system 130, it should be understood that principles of the present disclosure may be applied to a blockchain based identity management system having any suitable number of identity management systems interconnected to blockchain network 101.

Figure 2B:
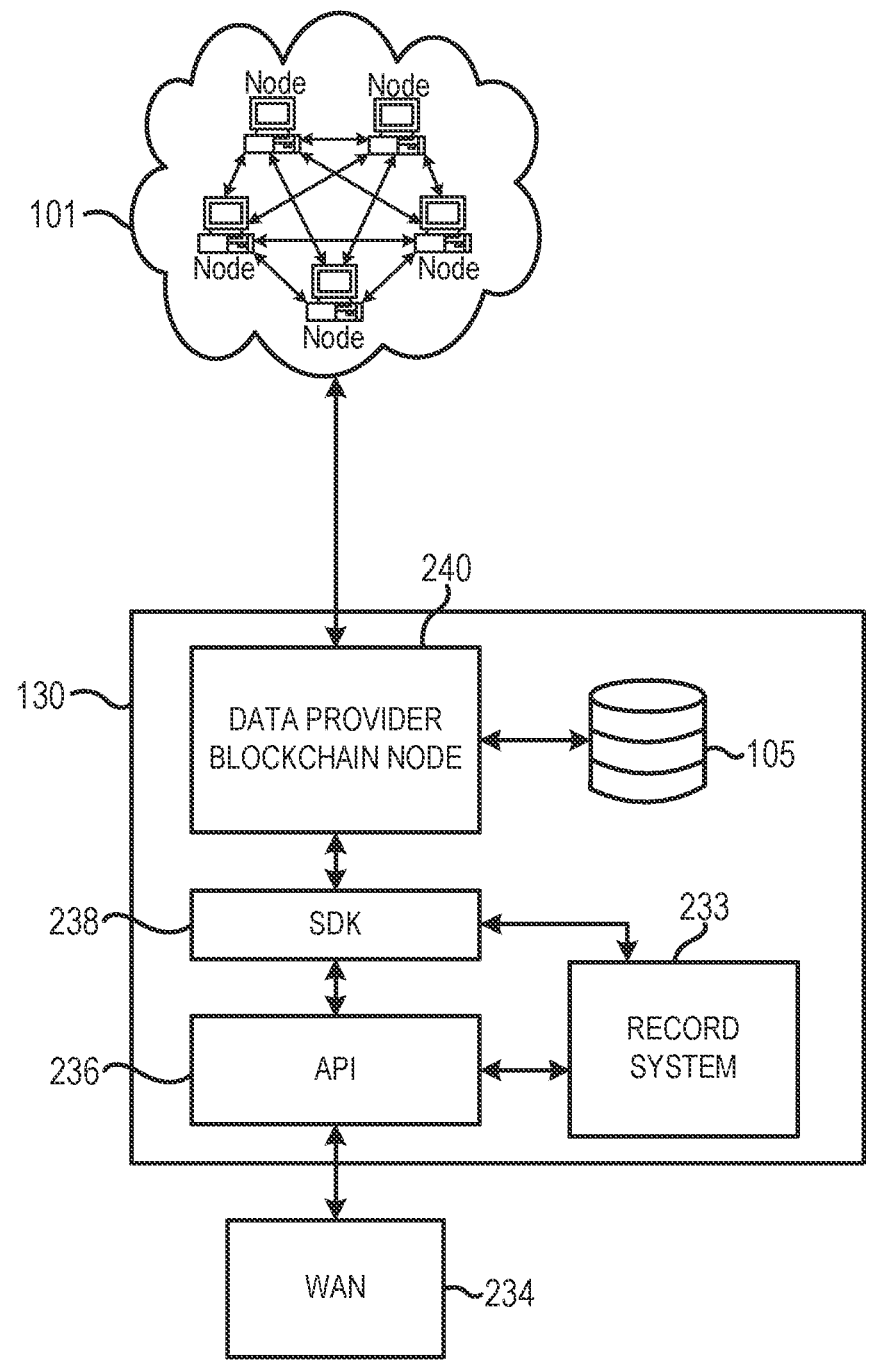
FIG. 2B illustrates an exemplary data provider system in a blockchain based identity management system, in accordance with various embodiments.

In various embodiments, and with reference to FIG. 2B, an exemplary data provider system 130 is depicted. Data provider system 130 may comprise one or more of a records system 233, an application programming interface (API)

236, a software development kit (SDK) 238, and/or a Data Provider (DP) blockchain node 240 configured to maintain identity management blockchain 105. Records system 233, API 236, SDK 238, and/or a DP node 240 may be in direct logical communication with each other via a bus, network, and/or through any other suitable means, or may be individually connected as described further herein.

In various embodiments, record system 233 may be configured to receive a validation request from identity management blockchain 105, via DP blockchain node 240, validate the data (e.g., PII, PD, etc.) based on the validation request, and transmit the validated data to identity management blockchain 105, via DP blockchain node 240, as discussed further herein. In response to data request from identity management blockchain 105, record system 233 may be configured to transmit data to identity management system via network 324 or may be configured to transmit data to identity management blockchain 105 via DP blockchain node 240, as discussed further herein. Record system 233 may be in electronic and/or operative communication with back-end systems of seller system 130, such as, for example, systems configured to provide transaction processing, data collection, validation engines, and/or the like. Record system 233 may also be in electronic communication with DP blockchain node 240, via API 236 and/or SDK 238.

In various embodiments, API 236 and SDK 238 may be configured to provide software, services, and/or interfaces to enable communications between record system 233 and DP blockchain node 240. API 236 and SDK 238 may comprise programmatic libraries configured to translate and transmit queries and commands from record system 233 to DP blockchain node 240. For example, and in accordance with various embodiments, API 236 and/or SDK 238 may be configured to translate data received from record system 233 into a blockchain format using a blockchain SDK library, or the like, which may include digital signing using seller-specific security certificates. In that respect, API 236 and/or SDK 238 may comprise one or more data provider specific cryptographic keys used to perform cryptographic operations. As a further example, and in accordance with various embodiments, API 236 and/or SDK 238 may be configured to translate data retrieved from identity management blockchain 105 into a format readable by record system 233, which may include digital signature verification and/or data transformation from a blockchain specific data layout to an application specific data layout.

As an example, SDK 238 may include a blockchain oracle configured to generate one or more notifications in response to data being written to identity management blockchain 105. The blockchain oracle may be configured to query DP blockchain node 240 at a defined interval to search for new writes to identity management blockchain 105. The blockchain oracle may be controlled by notification triggers containing filters indicating the types of data written to identity management blockchain 105 that will generate a notification. For example, in response to the blockchain oracle determining that data has been written to identity management blockchain 105 that includes the a user ID (e.g., a SSI as described below) and a data provider ID corresponding to the DP blockchain node 240 (e.g., trusted relationship data linked to the data provider was written to identity management blockchain 105), the blockchain oracle may generate a search request and transmit the search request to record system 233. In response to the search request, record system 233 may return a trusted record to the DP blockchain node 240 which may write the trusted record to identity management blockchain 105. In various embodiments, the DP blockchain node 240 may transmit the trusted record to identity management system 110 via network 234.

In various embodiments, DP blockchain node 240 may be in electronic communication with blockchain network 101, and may be configured to allow data provider system 130 access to identity management blockchain 105 and blockchain network 101. Data provider blockchain node 240 may be configured to maintain a copy of identity management blockchain 105, write and/or retrieve data and blocks from identity management blockchain 105, validate blocks of identity management blockchain 105, and/or propagate writes to identity management blockchain 105 to blockchain network 101. DP blockchain node 240 may communicate with one or more blockchain nodes (e.g., IM blockchain node 220, financial institution blockchain node 260, etc.) to validate and write blocks to identity management blockchain 105, and to establish consensus between the blockchain nodes based on proof of work, proof of stake, practical byzantine fault tolerance, delegated proof of stake, or other suitable consensus algorithms.

DP blockchain node 240 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. DP blockchain node 240 may run applications to interact with identity management blockchain 105, communicate with other devices, perform crypto operations, and otherwise operate within seller system 130. For example, DP blockchain node 240 may run a client application that can be a thin client (web), a hybrid (i.e., web and native, such as iOS and Android), or a native application to make application programming interface (API) calls to interact with identity management blockchain 105, such as a web3 API compatible with blockchain databases maintained by ETHEREUM®.

With reference again to FIG. 1, financial institution system 150 may interact with system 100 to retrieve and view identity data, PII, PD, LOA information and/or the like. Financial institution system 150 may comprise any suitable combination of hardware, software, and/or database components. For example, may comprise one or more network environments, servers, computer-based systems, processors, databases, and/or the like. Financial institution system 150 may comprise at least one computing device in the form of a computer or processor, or a set of computers/processors, although other types of computing units or systems may be used, such as, for example, a server, web server, pooled servers, or the like. Financial institution system 150 may also include one or more data centers, cloud storages, or the like, and may include software, such as APIs, configured to retrieve and write data to the blockchain. In various embodiments, financial institution system 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, financial institution system 150 may comprise or interact with a traditional payment network to facilitate purchases and payments, authorize transactions, and/or settle transactions. For example, financial institution system 150 may represent existing proprietary networks that presently accommodate transactions for credit cards, debit cards, and/or other types of transaction accounts or transaction instruments. Financial institution system 150 may be a closed network that is secure from eavesdroppers. In various embodiments, financial institution system 150 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Financial institution system 150 may include systems and databases related to financial and/or transactional systems and processes, such as, for example, one or more authorization engines, authentication engines and databases, settlement engines and databases, accounts receivable systems and databases, accounts payable systems and databases, and/or the like. For example, financial institution system 150 may authorize and settle payment transactions, and maintain transaction account member databases, accounts receivable databases, accounts payable databases, or the like.

Although the present disclosure makes reference to financial institution system 150, it should be understood that principles of the present disclosure may be applied to a blockchain based identity management system having any suitable number of financial institution systems interconnected to blockchain network 101.

Figure 2C:
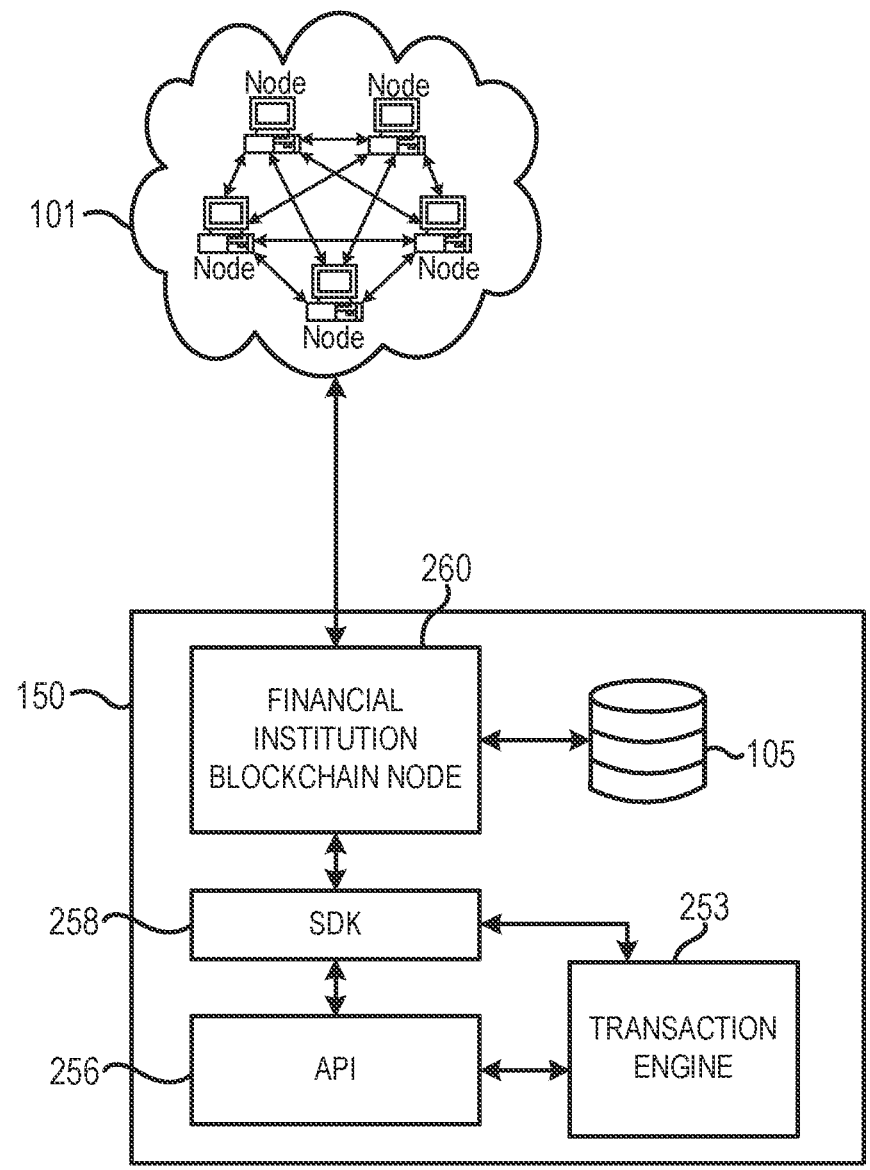
FIG. 2C illustrates an exemplary financial institution system in a blockchain based identity management system, in accordance with various embodiments.

In various embodiments, and with reference to FIG. 2C, an exemplary financial institution system 150 is depicted. Financial institution system 150 may comprise one or more of a transaction engine 253, an application programming interface (API) 256, a software development kit (SDK) 258, and/or a financial institution blockchain node 260 configured to maintain identity management blockchain 105. Payment product engine 253, API 256, SDK 258, and/or financial institution blockchain node 260 may be in direct logical communication with each other via a bus, network, and/or through any other suitable means, or may be individually connected as described further herein.

In various embodiments, transaction engine 253 may be configured to retrieve identity data comprising LOA scores from identity management blockchain 105, via financial institution blockchain node 260, execute one or more transactions based on the identity data, and transmit a transaction notification to identity management blockchain 105, via financial institution blockchain node 260, as discussed further herein. Transaction engine 253 may be configured to execute transactions based on transaction rules including threshold actions (such as, for example, alert, challenge, block, and/or lock) based on a LOA associated with an SSI.

Transaction engine 253 may be in electronic and/or operative communication with back-end systems of financial institution system 150, such as, for example, authorization engines, authentication engines and databases, settlement engines and databases, accounts receivable systems and databases, accounts payable systems and databases, and/or the like. Transaction engine 253 may also be in electronic communication with financial institution blockchain node 260, via API 256 and/or SDK 258.

In various embodiments, API 256 and SDK 258 may be configured to provide software, services, and interfaces to enable communications between payment product engine 253 and financial institution blockchain node 260. API 256 and SDK 258 may comprise programmatic libraries configured to translate and transmit queries and commands from payment product engine 253 to financial institution blockchain node 260. For example, and in accordance with various embodiments, API 256 and/or SDK 258 may be configured to translate data received from transaction engine 253 into a blockchain format using a blockchain SDK library, or the like, which may include digital signing using financial institution-specific security certificates. In that respect, API 256 and/or SDK 258 may comprise one or more financial institution-specific cryptographic keys used to perform cryptographic operations. As a further example, and in accordance with various embodiments, API 256 and/or SDK 258 may be configured to translate data retrieved from identity management blockchain 105 into a format readable by transaction engine 253, which may include digital signature verification and/or data transformation from a blockchain specific data layout to an application specific data layout.

As an example, SDK 258 may include a blockchain oracle configured to generate one or more notifications in response to data being written to identity management blockchain 105. The blockchain oracle may be configured to query financial institution blockchain node 260 at a defined interval to search for new writes to identity management blockchain 105. The blockchain oracle may be controlled by notification triggers containing filters indicating the types of data written to identity management blockchain 105 that will generate a notification.

For example, in response to the blockchain oracle determining that data has been written to identity management blockchain 105 that includes a user ID (e.g., a SSI as described below) and a financial institution ID corresponding to the financial institution blockchain node 260 (e.g., trusted relationship data linked to the financial institution was written to identity management blockchain 105), the blockchain oracle may generate a search request and transmit the search request to the transaction engine 253 which, in turn, may call a backend process to return a trusted record to the financial institution blockchain node 260 which may write the trusted record to identity management blockchain 105. In another example, in response to the blockchain oracle determining that data has been written to identity management blockchain 105 that includes the a user ID (e.g., a SSI as described below), the financial institution ID and a LOA change notification (e.g., updated LOA data for a SSI associated with the financial institution was written to identity management blockchain 105), the blockchain oracle may generate a transaction rules update and transmit the transaction rules update to transaction engine 253. In various embodiments, transaction engine 253 may be configured to update the transaction rules in response to the transaction rules update. For example, the transaction rules update may include updating a LOA threshold for threshold based actions such as, 'reduce an authentication level for a user' or 'enable an increased transaction amount'.

In various embodiments, financial institution blockchain node 260 may be in electronic communication with blockchain network 101, and may be configured to allow financial institution system 150 access to identity management blockchain 105 and blockchain network 101. Financial institution blockchain node 260 may be configured to maintain a copy of identity management blockchain 105, write to and/or retrieve data and blocks from identity management blockchain 105, validate blocks of identity management blockchain 105, and/or propagate writes to identity management blockchain 105 to blockchain network 101. Financial institution blockchain node 260 may communicate with one or more blockchain nodes (e.g., IM blockchain node 220, DP blockchain node 240, etc.) to validate and write blocks to identity management blockchain 105, and to establish consensus between the blockchain nodes based on proof of work, proof of stake, practical byzantine fault tolerance, delegated proof of stake, or other suitable consensus algorithms.

Financial institution blockchain node 260 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. Financial institution blockchain node 260 may run applications to interact with identity management blockchain 105, communicate with other devices, perform crypto operations, and otherwise operate within financial institution system 150. For example, financial institution blockchain node 260 may run a client application that can be a thin client (web), a hybrid (i.e., web and native, such as iOS and Android), or a native application to make application programming interface (API) calls to interact with identity management blockchain 105, such as a web3 API compatible with blockchain databases maintained by ETHEREUM®.

With reference again to FIG. 1, a blockchain address may be uniquely assigned to each identity management system 110, data provider system 130, and/or financial institution system 150 to function as a unique identifier in system 100. For example, each blockchain node of each identity management system 110, data provider system 130, and/or financial institution system 150 may register with system 100 and/or an existing trust participant (e.g., identity provider), and may be assigned and provided a private key and public key pair. For example, and in accordance with various embodiments, in a permissioned blockchain consortium, each individual participant system (identity management system 110, data provider system 130, and/or financial institution system 150) will procure a public key and private key pair from a third-party certificate authority (like DigiCert®, VeriSign®, etc.). In a blockchain consortium, one of the participant systems (e.g., identity management system 110) may initiate and create the blockchain network and may invite (or receive invitation requests from) one or more of the other participants to join the blockchain consortium. Invited participants may accept the request by transmitting a configuration request to join the blockchain consortium. The configuration request may be validated and/or approved by existing participants of the blockchain consortium using digital signature verification.

The private key may be stored with each respective identity management system 110, data provider system 130, and/or financial institution system 150, and as discussed further herein, data can be encrypted with the public key prior to writing to identity management blockchain 105. In response to retrieving the data from identity management blockchain 105, the associated identity management system 110, data provider system 130, and/or financial institution system 150 may decrypt the data using the private key. System 100 may generate the public key and private key pair using any suitable key pair generation technique and asymmetric key algorithm. In various embodiments, system 100 may generate quantum-safe keys using quantum encryption techniques such as unclonable functions captured via a 3D token extended into a hashed representation. In various embodiments, system 100 may use a Hierarchical Deterministic (HD) solution to enable the creation of one or more child keys from one or more parent keys in a hierarchy. Each child key may be assigned to an individual identity management system 110, data provider system 130, and/or financial institution system 150. For example, system 100 may use BIP32, BIP39, and/or BIP44 to generate an HD tree of public addresses.

The various communications discussed herein may be performed using a network. As used herein, the term "network" may further include any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), quantum based encryption systems, and symmetric and asymmetric cryptosystems. Asymmetric encryption in particular may be of use in signing and verifying signatures for blockchain crypto operations.

Referring now to FIGS. 3 through 6, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3 through 5, but also to the various system components as described above with reference to FIGS. 1, 2A, 2B, and 2C.

Figure 3:
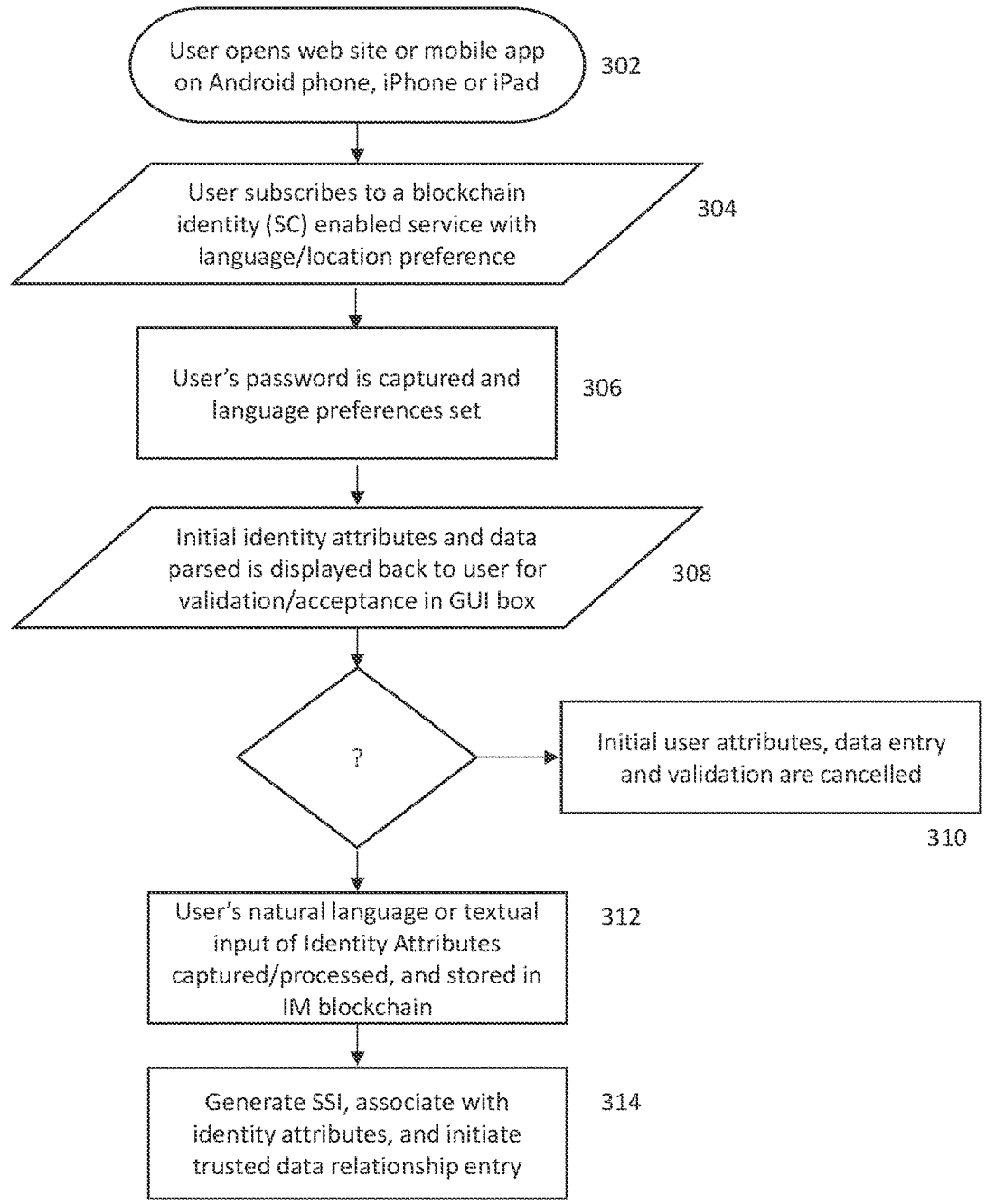
FIG. 3 illustrates an initialization process flow in a blockchain based identity management system, in accordance with various embodiments.

With reference to FIG. 3, an exemplary process flow 300 for identity assurance in a blockchain based identity management system is illustrated. A user may access the user interface 214 of identity management system 110 via user terminal 212 and may transmit an account creation request (step 302). The user interface 214 may prompt the terminal 212 for account creation information including location services preferences (e.g., language, region, city) (step 304). The account creation information may provide a baseline for risk engine 222 determination of login risk, as further discussed below. The system may receive the account creation information via user interface 214, and in response, may determine a language preference, such as for automated data input, machine reading, voice recognition and/or the like (step 306). The language preference may be determined, for example, in response to a language selection input or based on a NLP language detection algorithm and a voice input. In various embodiments, the account creation information may comprise at least one of a password, date of birth, nationality, gender, biometric sensor data (submitted via a biometric sensor), device metadata and/or the like. The system may employ active or passive collection methods to capture any suitable metadata known to those skilled in the art to build a unique device fingerprint. The system may, via data validation engine 226, parse the account creation information into a plurality of identity attributes (i.e., account creation identity attributes). Parsing may include regularization and normalization of the data. The account creation identity attributes may be displayed by user interface 214 for user acceptance by the user via user terminal 212 (step 308). In one example, the user may accept the identity attributes where they conform to a user intent to present an identity. Alternatively, the user may reject the creation identity attributes in the event they do not conform to the user intent. The system may receive a user message to terminate the process (step 310) or may pass a user acceptance message to data validation engine 226.

In response to the user acceptance message, data validation engine 226 may pass the parsed identity attributes of the account creation information to IM blockchain node 220. The IM blockchain node 220 may write the account creation identity attributes parsed from the account creation information to the identity management blockchain 105 (step 312). In response to writing the account creation identity attributes to the identity management blockchain 105, the data validation engine 226 may generate a Self-Sovereign Identity (SSI) and associate the SSI with each of the identity creation attributes (step 314). Step 314 may include writing, by the IM blockchain node, the SSI association to the identity management blockchain 105. In various embodiments, the data validation engine 226 may associate the plurality of account creation identity attributes with the SSI on a many-to-one basis. In this regard, the SSI association with the identity attributes of identity management blockchain 105 may define a branching structure (e.g., arc lengths and/or time and distance based levels of separation) or a portion of the branching structure of a graphical database comprising related links (i.e. identity attributes related to the SSI) which may be visualized by data visualization engine 224 and displayed via user interface 214. Step 314 may include user interface 214 prompting via user terminal 212 the user to initiate a trusted data relationship validation process.

Figure 4:
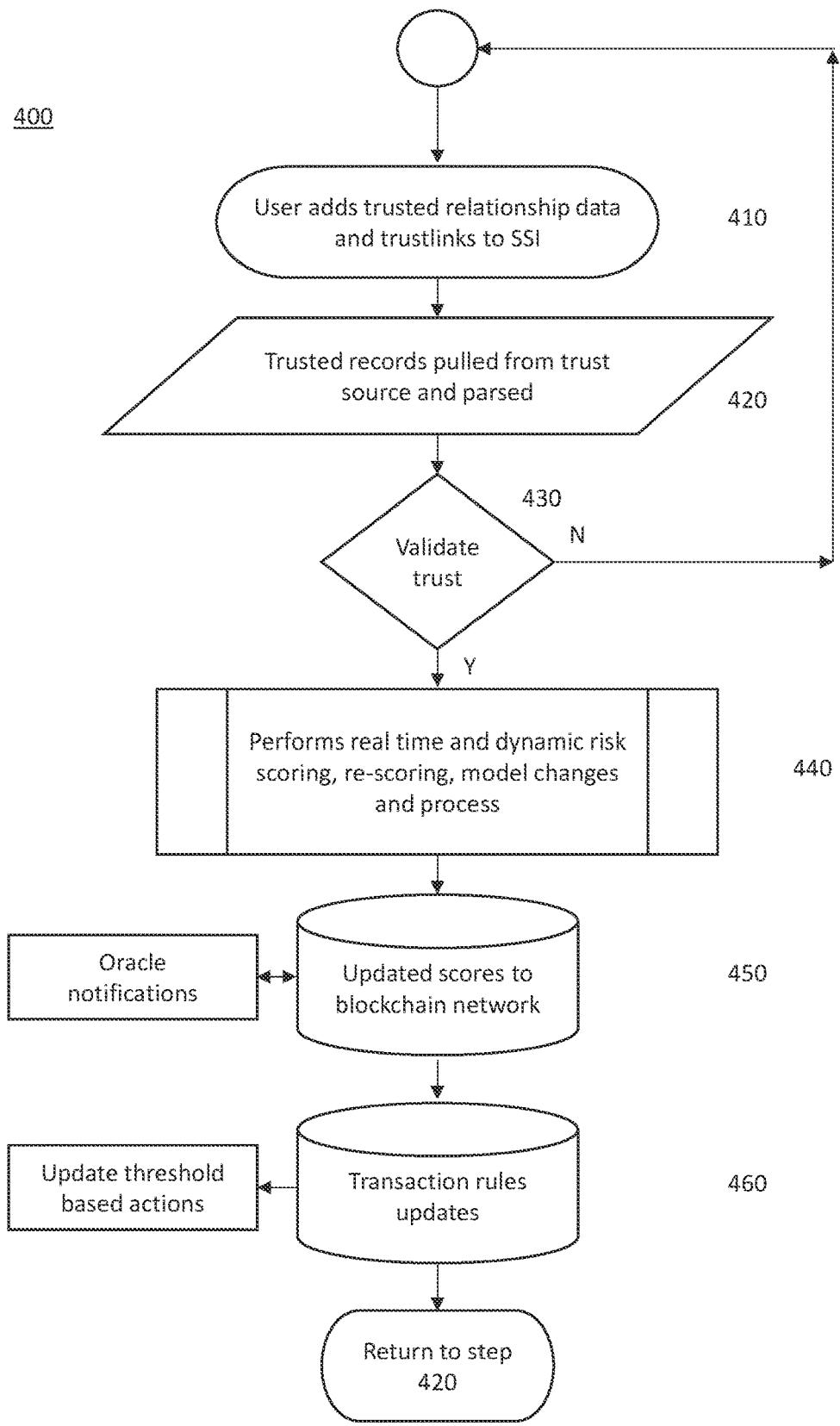
FIG. 4 illustrates a process flow for identity assurance in a blockchain based identity management system, in accordance with various embodiments.

With additional reference to FIG. 4, a process flow 400 for identity assurance in a blockchain based identity management system is illustrated, in accordance with various embodiments. The system may initiate a trusted data relationship validation process in response to receiving one or more trusted relationship data from user terminal 212 (step 410). In various embodiments, the trusted relationship data may include digitized or electronic documents such as, for example, a passport, driver's license, national identification, social security card, educational credentials and/or professional credentials such as diplomas and certificates etc., government licenses, financial institution records, access credentials to big data records (e.g., genetic databases, biometric databases, social media databases, etc.) and/or the like. Step 410 may include data validation engine 226 parsing the trusted relationship data into identity attributes (i.e., trust relationship identity attributes). Step 410 may include identity management system 110 receiving user specific access credentials to a user portal trusted data provider such as, for example, social media sites including FACEBOOK®, FOURSQUARE®, TWITTER®, MYSPACE®, LINKEDIN®, and the like.

Step 410 may include data validation engine 226 associating the trust relationship identity attributes with one of a financial institution ID or a data provider ID, and generating a corresponding branching structure of trustlinks associated with the SSI. Each of the trustlinks may be associated on a many-to-one basis with the SSI, a many-to-one basis with a trust source (e.g., data provider system 130 and/or financial institution system 150) and on a one-to-one basis with the trust relationship identity attributes. Stated another way, the trust relationship identity attributes may be associated with the trust source via the trustlinks. In response to generating the trustlinks, IM blockchain node 220 may write the trust relationship identity attributes and the trustlinks to the identity management blockchain 105. In this regard, the SSI association with the trustlinks of identity management blockchain 105 may define a branching structure or a portion of the branching structure of a graphical database comprising related links (e.g. trust relationship identity attributes related to the SSI and a trust source) which may be visualized by data visualization engine 224 and displayed via user interface 214.

In response to IM blockchain node 220 writing the trust relationship identity attributes and the trustlinks to identity management blockchain 105, the system may pull trusted records from the trust source (step 420). For example, step 420 may include a blockchain oracle of data provider system 130 generating a search request and transmitting the search request to record system 233. DP blockchain node 240 may write a trusted record corresponding to the trustlinks to identity management blockchain 105 and IM blockchain node may read the trusted record. In various embodiments, the DP blockchain node 240 may transmit the trusted record to identity management system 110 via network 234. Data validation engine 226 may receive the trusted record from IM blockchain node 220 and may parse the trusted record into trusted record elements. Step 420 includes data validation engine 226 associating the trusted record elements with the trustlinks on a one-to-one basis. In another example, step 420 may include financial institution blockchain node 260 that writes transaction information, corresponding to the trustlinks, from transaction engine 253 to identity management blockchain 105. IM blockchain node 220 may read the transaction information from identity management blockchain 105 and pass the transaction information to data validation engine 226. Data validation engine 226 may parse the transaction information into trusted record elements for association with the trustlinks.

The system may validate the trusted relationship data based on the association of the trustlinks and the trusted record elements and a trust model (step 430). The trust model may be based on machine learning techniques, Minimum Spanning Tree (MST), Euler path, Hamilton path, Finding Nearest Neighbor (e.g. k-NN, weighted k-NN, etc.), clustering, graph traversal, and/or other algorithms. For example, the trust model may validate links based on a distance from the nearest neighbor, confusion matrix and/or cross validation techniques (adversarial, k-fold, etc.). In various embodiments, the trust model output may be passed to risk engine 222 which may calculate a LOA score for each trusted record and each trusted relationship data (e.g., a first LOA associated with a first identity attribute, a second LOA associated with a second identity attribute, a third LOA associated with a trusted relationship data, etc.). (Step 440).

In various embodiments, risk engine 222 may calculate an aggregate LOA score based on the SSI. Stated another way, the risk engine may calculate discrete LOA scores for any of the identity attributes, trusted record, trusted relationship data and, based on the discreet LOA scores determine an overall LOA for the SSI. For example, the discreet LOA scores may be weighted based on their association with the trust links to determine branch scores which may be aggregated to the overall score or the branch scores may undergo a second weighting round prior to aggregation. In this regard, the identity management blockchain 105 may comprise a plurality of SSIs each with an associated branching graph of trustlinks which build over time through layering of trusted records and trusted relationship data.

The risk model may comprise a blend of one or more risk checks for determining a LOA (or a session risk score as described below with reference to FIG. 5). For example, the risk model may include analysis of location data, device fingerprinting, geo-fencing, geo-velocity (e.g., transaction history tied with location data), transaction history, trust source (e.g., identity, assurance level of the data), and/or the like. Risk engine 222 may perform dynamic real-time or near-real time LOA calculations based on the trust model output and a risk model. In various embodiments, the risk model may alter the LOA calculations based on historical trust model output associated with the SSI (i.e. identity attribute history). In this regard, the historical information may benefit determining a pattern of trust. For example, if a user operates according to historically repeating patterns the risk model may be weighted to increase LOA scores. However, where actions occur which are 'out-of-pattern' the model may be weighted to decrease scores. In various embodiments, the weights accorded to historically repeating patterns may be determined by machine learning (e.g., supervised or unsupervised learning algorithms) and/or may be tuned by configuration. In another example, the weight of discrete LOA scores may degrade over time or may be reduced based on the 'stale' character of a trustlink.

The system may update the identity management blockchain 105 with the LOA scores determined by the risk engine 222 (step 450). Step 450 may include risk engine 222 passing a plurality of LOA scores to data validation engine 226. Data validation engine 226 may associate the LOA scores on a one-to-one basis with the trustlinks and IM blockchain node 220 may write the LOA scores to the identity management blockchain based on the association with the trustlinks. Step 450 may include generating, by a blockchain oracle of an SDK, an oracle notification in response to updating the identity management blockchain 105 with the LOA scores. The system may update transaction rules and/or threshold based actions based on the associated LOA scores (step 460). For example, a transaction rule may be of the form, 'provide a financial product where a LOA associated with a residential trustlink exceeds a threshold' and the system may update the threshold based on the aggregate LOA. Step 460 may include a blockchain oracle of SDK 258 generating a transaction rules update and transmitting the transaction rules update to the transaction engine 253 of financial institution system 150.

Figure 5:
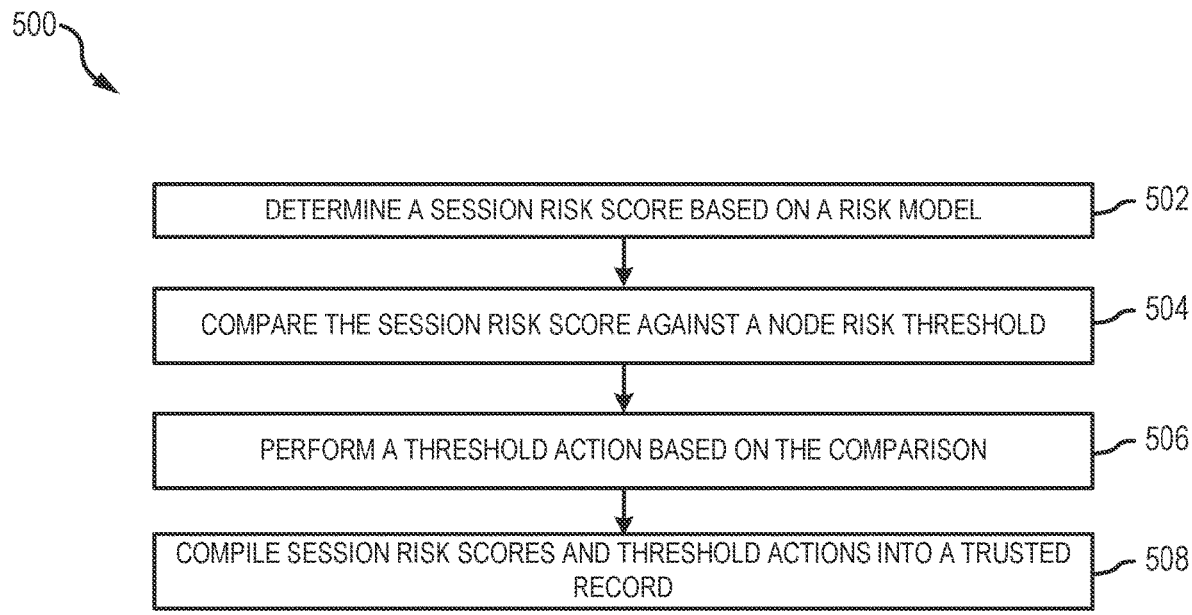
FIG. 5 illustrates a process flow for session risk mitigation in a blockchain based identity management system, in accordance with various embodiments.

Referring again to FIGS. 1-3 and additionally to FIG. 5, a process 500 for mitigating session risk in a blockchain based identity management system is illustrated, in accordance with various embodiments. The risk engine 222 may, based on the risk model, determine a session risk score (step 502) for each login attempt or write attempt from a blockchain node (i.e., session risk) such as from user terminal 212, data provider system 130, and/or financial institution system 150. The risk engine 222 may then compare this session risk score against a node risk threshold determined for each participant in the identity management blockchain (step 504).

The session risk score estimates the risk associated with a log-in attempt based on a user's typical login and usage profile, taking into account, for example, login meta data (parsed to identity attributes by data validation engine 226) such as any one or more of the user's device and geographic location, the system the user is trying to access, the time of day the user typically logs in, the user device's IP address, the user's typing speed and/or the like. In various embodiments, any suitable identity attributes may be used as a basis for risk engine 222 to determine the login risk. In one example, a user logging into system 100 may have a low login risk score if the user uses the same user terminal hardware WINDOWS® desktop), at roughly the same time of day (e.g., 0900 GMT), from the same location (e.g., Idaho), and from the same IP address. By contrasting example, an attempt to access system 100 from an alternative terminal (ANDROID® tablet), at an alternative time (e.g., 2200 GMT), in an alternative location (e.g., Bali), may yield an elevated risk score. In this regard, risk engine 222 may in real-time or near real-time calculate login risk based on metadata and may perform a threshold action based on the comparison of the session risk score and the node risk threshold (step 506).

In various embodiments, node risk thresholds for individual system blockchain nodes (e.g., blockchain node 220, DP blockchain node 240, and financial institution blockchain node 260, etc.) may be established based on the sensitivity of the information they store and the impact if the related system were breached. For example, the node risk thresholds may be established by configuration files or may be determined by a machine learning algorithm. Systems housing confidential financial data, for example, may have a low node risk threshold. In various embodiments, a threshold action may comprise a rule such as, 'if the session risk score for a user's access attempt exceeds the system's node risk threshold, enable an additional authentication control' which may prompt the user to provide a higher level of authentication, such as a PIN or token. In various embodiments, a threshold action may include termination of the login attempt or write attempt to identity based blockchain 105. In various embodiments, the system may maintain a history of session risks for each participant and may refuse connections from nodes with historically elevated session risk scores. The system may compile the history of session risk scores and threshold actions into a trusted record (step 508) which may be associated by the data validation engine 226 with trustlinks The disclosure also provides methods and systems related to the detection of session tampering and/or hijacking that can be used in an effort to prevent fraud. The system provides solutions against session tampering and/or hijacking. In various embodiments, the methods and systems collect multiple computer or device "fingerprints" during online visits to sites for banks, financial institutions or other companies that conduct transactions over the Internet. During the course of an online session, a Session Identifier (Session ID) can be assigned to facilitate the exchange of data between computers or devices (server/client). When a user accesses or visits an online account or site using a personal computer (PC) or any device connected to the Internet over HTTP(s) protocol, a PC or device fingerprint corresponding to that computer or device and the relevant Session ID may be collected in accordance with various embodiments.

In various embodiments, the method may include one or more steps of collecting computer or device fingerprints and Session IDs at various instances throughout an online session. For example, such information may be collected when a user navigates to a log-in page, a page that concludes a transaction or HTML pages from a Web site that are common for online banking applications such as setting up new payees, changes of address (e-mail or street), and authorizing the wiring or transfer of money. Fingerprinting data may be collected with or without cookies for example, by delivering a fingerprinting payload to the user device. By collecting fingerprints and/or Session ID information at several site locations or instances throughout a session, and by tracking the assigned Session ID for that particular session, incidents of session tampering or session hijacking can be detected, so that appropriate responses may be conducted during the online session or post-session.

In various embodiments, methods of detecting session tampering are also provided that involve analysis of collected device fingerprints during different time intervals of an online session and/or at different portions of a web site being viewed. In various embodiments, the method includes the analysis and comparison of device (Thing) fingerprints corresponding to a user device containing a relevant Session ID and other identifying information associated with the device.

In various embodiments, systems and methods for implementing secure transactions include online purchases over the Internet. These solutions allow network or Internet users to more securely perform online transactions with other parties such as banking and financial institutions, vendors of merchandise and/or services or other transactions made over the Internet or a computer network. The occurrence of incidents involving electronic interception or session tampering or hijacking can be detected based on, for example, graphical analysis of the trustlinks to alert companies who can thereby initiate responsive actions to prevent fraud, identify or credit card theft and financial loss.

Other goals and advantages of the disclosure will be further appreciated and understood when considered in conjunction with the following description and accompanying drawings. While the following description may contain specific details describing particular embodiments of the disclosure, this should not be construed as limitations to the scope of the disclosure but rather as an exemplification of preferable embodiments. For each aspect of the disclosure, many variations are possible as known to those of ordinary skill in the art. A variety of changes and modifications can be made in the scope of the disclosure without departing from the spirit thereof.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org.docs/.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®,)(BOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant web site, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like). In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®, and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

As used herein, the term "user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The disclosure and claims do not describe only a particular outcome of enabling a buyer-centric marketplace using blockchain, but the disclosure and claims include specific rules for implementing the outcome of a buyer-centric marketplace using blockchain and that render information into a specific format that is then used and applied to create the desired results of enabling a buyer-centric marketplace using blockchain, as set forth in McRO, Inc. v. Bandai Namco Games America Inc. (Fed. Cir. case number 15-1080, Sep. 13, 2016). In other words, the outcome of enabling a buyer-centric marketplace using blockchain can be performed by many different types of rules and combinations of rules, and this disclosure includes various embodiments with specific rules. While the absence of complete preemption may not guarantee that a claim is eligible, the disclosure does not sufficiently preempt the field of buyer-centric marketplaces at all. The disclosure acts to narrow, confine, and otherwise tie down the disclosure so as not to cover the general abstract idea of just a buyer-centric marketplace. Significantly, other systems and methods exist for enabling buyer-centric marketplaces, so it would be inappropriate to assert that the claimed invention preempts the field or monopolizes the basic tools of buyer-centric marketplaces. In other words, the disclosure will not prevent others from enabling buyer-centric marketplaces, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   receiving, by a processor, a first identity attribute;
   determining, by the processor, a corresponding first Level of Assurance (LOA) based on the first identity attribute and a first attribute history;
   receiving, by the processor, a second identity attribute;
   determining, by the processor, a corresponding second LOA based on the second identity attribute and a second attribute history;
   defining, by the processor, a Self-Sovereign Identity (SSI) based on the first identity attribute, the second identity attribute, the first LOA, and the second LOA;
   receiving, by the processor, raw data comprising at least one of internet protocol data, device fingerprint data, browser fingerprint data, unique user data, session ID data, local time, remote time, or transaction data;
   applying, by the processor, predictive modeling techniques to the raw data;
   generating, by the processor, a predictive data set based on the applied predictive modeling techniques;
   determining, by the processor, a threshold for a threshold based action, based on a machine learning technique applied to the predictive data set and feedback inputs including at the least one of the internet protocol data, the device fingerprint data, the browser fingerprint data, the unique user data, the session ID data, the local time, the remote time, or the transaction data; and
   performing, by the processor, the threshold based action, wherein the threshold based action includes at least one of an alert, a challenge, a block, or a lock.

2. The method of claim 1, wherein determining at least one of the first LOA or the second LOA is further based on a validation process of a plurality of trustlinks by a trust model and a risk engine.

3. The method of claim 1, wherein the processor communicates with an Identity Management (IM) blockchain node, and wherein the IM blockchain node communicates with a data validation engine and a risk engine.

4. The method of claim 1, wherein the processor communicates with an identity management (IM) blockchain node, and wherein the IM blockchain node communicates with an identity management blockchain.

5. The method of claim 1, wherein the first LOA is associated with a first trust link and the second LOA is associated with a second trust link.

6. The method of claim 1, wherein at least one of the first identity attribute or the second identity attribute comprises the at least one of the internet protocol data, the device fingerprint data, the browser fingerprint data, the unique user data, the session ID data, the local time, the remote time, or the transaction data.

7. The method of claim 1, wherein the first identity attribute is different than the second identity attribute.

8. The method of claim 1, further comprising determining, by the processor, an aggregate LOA based on the SSI.

9. The method of claim 1, further comprising generating, by the processor, a plurality of trustlinks defining nodes in a graphical data structure.

10. The method of claim 1, further comprising generating, by the processor, a plurality of trustlinks defining nodes in a graphical data structure, wherein each trustlink of the plurality of trustlinks defines an association between the SSI, a trust source, a trusted record element, and an identity attribute.

11. The method of claim 1, further comprising generating, by the processor, a plurality of trustlinks defining nodes in a graphical data structure, wherein each of the plurality of trustlinks are associated on a many-to-one basis with the SSI, a many-to-one basis with a trust source, a one-to-one basis with a trusted record element, and on a one-to-one basis with an identity attribute.

12. The method of claim 1, further comprising associating, by the processor, each of a plurality of trustlinks on a many-to-one basis with the SSI, a many-to-one basis with a trust source, a one-to-one basis with a trusted record element, and on a one-to-one basis with an identity attribute.

13. The method of claim 1, further comprising transmitting, by the processor, a trusted record element, in response to generating a plurality of trustlinks associated with the SSI.

14. The method of claim 1, further comprising generating, by the processor, a plurality of trustlinks, wherein the plurality of trustlinks define at least one of a branching structure or a portion of the branching structure of a graphical database comprising a plurality of identity attributes related to the SSI, a trust source, and a plurality of trusted record elements.

15. The method of claim 1, wherein the processor is in communication with at least one of a data provider blockchain node or a financial institution blockchain node.

16. The method of claim 1, further comprising updating, by the processor, a transaction rule, in response to determining an aggregate LOA.

17. The method of claim 1, further comprising:
receiving, by the processor and via an identity management (IM) blockchain node, a trusted relationship data associated with a trust source;
writing, by the processor and via the IM blockchain node, to an identity management blockchain a record of an association between the trusted relationship data and the trust source as a plurality of trustlinks associated with the SSI;
retrieving, by the processor via the IM blockchain node and from an identity management blockchain, a trusted record, wherein the trusted record is written to the identity management blockchain by one of a data provider blockchain node or a financial institution blockchain node, and wherein the trusted record is retrieved based on the plurality of trustlinks; and
writing, by the processor and via the IM blockchain node, a plurality of LOA scores to the identity management blockchain, wherein each of the plurality of LOA scores are associated on a one-to-one basis with each of the plurality of trustlinks.

18. A system comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a first identity attribute;
determining, by the processor, a corresponding first Level of Assurance (LOA) based on the first identity attribute and a first attribute history;
receiving, by the processor, a second identity attribute;
determining, by the processor, a corresponding second LOA based on the second identity attribute and a second attribute history;
defining, by the processor, a Self-Sovereign Identity (SSI) based on the first identity attribute, the second identity attribute, the first LOA, and the second LOA;
receiving, by the processor, raw data comprising at least one of internet protocol data, device fingerprint data, browser fingerprint data, unique user data, session ID data, local time, remote time, or transaction data;
applying, by the processor, predictive modeling techniques to the raw data;
generating, by the processor, a predictive data set based on the applied predictive modeling techniques;
determining, by the processor, a threshold for a threshold based action, based on a machine learning technique applied to the predictive data set and feedback inputs including at the least one of the internet protocol data, the device fingerprint data, the browser fingerprint data, the unique user data, the session ID data, the local time, the remote time, or the transaction data; and
performing, by the processor, the threshold based action, wherein the threshold based action includes at least one of an alert, a challenge, a block, or a lock.

19. The system of claim 18, wherein determining at least one of the first LOA or the second LOA is further based on a validation process of a plurality of trustlinks by a trust model and a risk engine.

20. An article of manufacture including a non-transitory, tangible computer readable storage medium having instructions stored thereon that, in response to execution by a processor, cause the processor to perform operations comprising:
receiving, by the processor, a first identity attribute;
determining, by the processor, a corresponding first Level of Assurance (LOA) based on the first identity attribute and a first attribute history;
receiving, by the processor, a second identity attribute;
determining, by the processor, a corresponding second LOA based on the second identity attribute and a second attribute history;
defining, by the processor, a Self-Sovereign Identity (SSI) based on the first identity attribute, the second identity attribute, the first LOA, and the second LOA;
receiving, by the processor, raw data comprising at least one of internet protocol data, device fingerprint data, browser fingerprint data, unique user data, session ID data, local time, remote time, or transaction data;
applying, by the processor, predictive modeling techniques to the raw data;
generating, by the processor, a predictive data set based on the applied predictive modeling techniques;
determining, by the processor, a threshold for a threshold based action, based on a machine learning technique applied to the predictive data set and feedback inputs including at the least one of the internet protocol data, the device fingerprint data, the browser fingerprint data, the unique user data, the session ID data, the local time, the remote time, or the transaction data; and
performing, by the processor, the threshold based action, wherein the threshold based action includes at least one of an alert, a challenge, a block, or a lock.

* * * * *